(12) United States Patent
Carroll (10) Patent No.: US 11,575,536 B2
(45) Date of Patent: Feb. 7, 2023

(54) SYSTEM AND METHOD USING ONE OR MORE SMART DEVICES TO DETERMINE INDIVIDUAL CONSUMPTION THROUGH NETWORK MONITORING

(71) Applicant: Bank of America Corporation, Charlotte, NC (US)

(72) Inventor: Matthew Edward Carroll, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/350,923

(22) Filed: Jun. 17, 2021

(65) Prior Publication Data

US 2022/0407737 A1 Dec. 22, 2022

(51) Int. Cl.
*H04L 12/28* (2006.01)

(52) U.S. Cl.
CPC ...... *H04L 12/2825* (2013.01); *H04L 12/2809* (2013.01); *H04L 12/2838* (2013.01)

(58) Field of Classification Search
CPC ............. H04L 12/2825; H04L 12/2809; H04L 12/2838
See application file for complete search history.

(56) References Cited

U.S. PATENT DOCUMENTS

| 8,145,361 | B2 | 3/2012 | Forbes, Jr. et al. |
| 8,249,731 | B2 | 8/2012 | Tran et al. |
| 8,260,471 | B2 | 9/2012 | Storch et al. |
| 8,319,627 | B2 | 11/2012 | Chan et al. |
| 8,321,188 | B2 | 11/2012 | Johnson et al. |
| 8,335,593 | B2 | 12/2012 | Johnson et al. |
| 8,339,069 | B2 | 12/2012 | Chemel et al. |
| 8,487,634 | B2 | 7/2013 | Masters et al. |
| 8,665,111 | B2 | 3/2014 | Wang et al. |
| 8,704,678 | B2 | 4/2014 | Wang et al. |
| 8,855,794 | B2 | 10/2014 | Imes et al. |
| 9,014,996 | B2 | 4/2015 | Kamel et al. |
| 9,020,769 | B2 | 4/2015 | Rada et al. |
| 9,104,189 | B2 | 8/2015 | Berges Gonzalez et al. |
| 9,190,844 | B2 | 11/2015 | Tran |
| 9,218,632 | B2 | 12/2015 | Venkatakrishnan et al. |
| 9,881,259 | B2 | 1/2018 | Forbes, Jr. |
| 9,929,917 | B2 | 3/2018 | Jones-Mcfadden et al. |
| 9,946,237 | B2 | 4/2018 | Nishibayashi et al. |

(Continued)

*Primary Examiner* — John A Follansbee
*Assistant Examiner* — Raqiul A Choudhury (57) ABSTRACT

An apparatus for determining individual consumption for a plurality of users through computer network monitoring. The apparatus comprises a memory and a processor. The processor is configured to receive data from one or more smart devices associated with a first user and a second user through data streaming between the one or more smart devices and a server. The processor is further configured to determine that a first home associated with the first user and a second home associated with a second user are located within a distance threshold from each other based, at least in part, on geolocation information. The processor is further configured to determine that the first user and the second user are comparable peers. The processor is further configured to determine that an individual consumption of one of the comparable peers is greater than an average total consumption and to transmit an alert.

20 Claims, 3 Drawing Sheets

(56) References Cited

U.S. PATENT DOCUMENTS

| | | | |
|---|---|---|---|
| 10,025,337 B2 | 7/2018 | Hancock et al. | |
| 10,116,134 B2 | 10/2018 | Forbes, Jr. | |
| 10,187,707 B2 | 1/2019 | Norwood et al. | |
| 10,303,194 B2 | 5/2019 | Forbes, Jr. | |
| 10,503,234 B2 | 12/2019 | Davis et al. | |
| 10,524,268 B2 | 12/2019 | Ogrinz | |
| 10,637,246 B2 | 4/2020 | Clifton | |
| 10,733,334 B2 | 8/2020 | Santarone et al. | |
| 10,768,654 B2 | 9/2020 | Forbes, Jr. | |
| 10,831,223 B2 | 11/2020 | Forbes, Jr. | |
| 10,861,112 B2 | 12/2020 | Forbes, Jr. et al. | |
| 10,862,784 B2 | 12/2020 | Kagan et al. | |
| 10,924,144 B2 | 2/2021 | Zalewski et al. | |
| 11,216,211 B1 * | 1/2022 | Miranda | G06F 9/45558 |
| 2011/0202195 A1 | 8/2011 | Finch et al. | |
| 2017/0063566 A1 | 3/2017 | Seminario et al. | |
| 2017/0213451 A1 | 7/2017 | Potucek et al. | |
| 2018/0144416 A1 | 5/2018 | Osann, Jr. | |
| 2018/0240322 A1 | 8/2018 | Potucek et al. | |
| 2018/0263040 A1 * | 9/2018 | Ogrinz | H04W 76/10 |
| 2018/0364664 A1 * | 12/2018 | Gustafson | G06Q 50/06 |
| 2018/0364666 A1 * | 12/2018 | Haghighat-Kashani | G06Q 30/02 |
| 2019/0013960 A1 | 1/2019 | Sadwick | |
| 2019/0041887 A1 | 2/2019 | Forbes, Jr. | |
| 2019/0213638 A1 * | 7/2019 | Hurewitz | G06Q 30/0269 |
| 2019/0265971 A1 | 8/2019 | Behzadi et al. | |
| 2019/0390977 A1 | 12/2019 | Frader-Thompson et al. | |
| 2020/0101367 A1 | 4/2020 | Tran et al. | |
| 2020/0274366 A1 | 8/2020 | Forbes, Jr. | |
| 2020/0285626 A1 * | 9/2020 | Palanivelu | G06F 16/27 |

\* cited by examiner

SYSTEM AND METHOD USING ONE OR MORE SMART DEVICES TO DETERMINE INDIVIDUAL CONSUMPTION THROUGH NETWORK MONITORING

TECHNICAL FIELD

The present disclosure relates generally to monitoring individual consumption through one or more smart devices. More particularly, the present disclosure is related to a system and method using one or more smart devices to determine individual consumption through network monitoring.

BACKGROUND

Homes are increasingly incorporating smart devices to increase efficiency of operation of the homes. These smart devices are capable of connecting to each other and to communication networks in order to operate as a cohesive system within the home and with a degree of autonomy. Many smart devices are manufactured as distinct appliances, and integration with each other can result in incompatibilities and provide for limited functionality.

SUMMARY

The present disclosure provides for an apparatus for determining individual consumption for a plurality of users through computer network monitoring. One or more smart devices monitor the consumption of a utility by each smart device and transmits the consumption to the apparatus. The apparatus can receive the transmitted consumption and determine an average consumption per smart device and an individual consumption that is the summation of each average consumption in a specific location, such as a home. The apparatus can then compare the individual consumptions of a grouping of homes and alert a user associated with one of the homes if the individual consumption of that home is greater than an average total consumption of the grouping of homes.

In an embodiment, an apparatus for determining individual consumption for a plurality of users through computer network monitoring comprises a memory and a processor associated with a server. The memory is configured to store energy usage data comprising the amount of energy consumption for a first home associated with a first user and a second home associated with a second user. The memory is further configured to store account data for the first user and the second user, wherein the account data comprises a log of transactions over time for each of the first user and the second user. The processor is operably coupled to the memory and configured to receive data from one or more smart devices associated with the first user through data streaming between the one or more smart devices and the server. The processor is further configured to receive data from one or more smart devices associated with the second user through data streaming between the one or more smart devices and the server. The processor is further configured to transmit the received data from the one or more smart devices associated with the first user and the second user to the memory for storage. The processor is further configured to determine that the first home and the second home are located within a distance threshold from each other based, at least in part, on geolocation information. The processor is further configured to determine that the first user and the second user are members of a grouping designated as comparable peers, based, at least in part, on the received data from the one or more smart devices associated with each of the first user and the second user, the energy usage data for each of the first home and the second home, and the account data for each of the first user and the second user. The received data, energy usage data, and account data of each of the members is within a threshold for the comparable peers. The processor is further configured to monitor the one or more smart devices of the members of the comparable peers over a period of time to determine an average total consumption based, in part, on an individual consumption of each of the members of the comparable peers. The processor is further configured to determine that the individual consumption of one of the members of the comparable peers is greater than the average total consumption. The processor is further configured to transmit an alert to the one of the members of the comparable peers with the individual consumption greater than the average total consumption indicating that the individual consumption of that one of the members is greater than the average total consumption.

Previous technology used for smart devices suffers from disadvantages. For example, this disclosure recognizes that each smart device can be manufactured distinctly from each other. Each smart device can operate on its own system that may be incompatible with another smart device within the home. In this example, interactive operation between two distinct smart devices can be limited. Further, a user associated with the smart devices may not be able to effectively monitor operation of each one of those smart devices if their operations are limited. In another example, users are not able to determine an individual consumption of their associated homes. Smart devices that utilize the same utility (such as electricity, water, or gas), are not being collectively monitored to determine how much individual consumption of a given utility is being used by each home. Further, there is no comparison among homes having similar characteristics (such as size or number of rooms) to determine whether an individual consumption of a given home is greater than the average among those homes.

Certain embodiments of this disclosure provide unique solutions to the technical problems identified above by providing an apparatus for determining individual consumption for a plurality of users through computer network monitoring. For example, the disclosed apparatus provides several technical advantages, which include: 1) receiving the device consumption of each smart device; 2) determining derivative parameters from the device consumption, such as individual consumption per home and average total consumption for a grouping of homes; 3) providing an alert to a user associated with a home that has an individual consumption greater than the average total consumption; and 4) providing a recommendation to the user to take an action in order to decrease the individual consumption. Typically, the user associated with a home would not be aware of the individual consumption of each utility determined from the smart devices included in that home. The smart devices may have separately conveyed to the user the device consumption of that smart device. The disclosed apparatus may determine the individual consumption of each utility and transmit an alert and recommendation when the individual consumption is greater than an average value of comparable peers.

In some embodiments, improvements provided by this disclosure are incorporated into the practical application of an apparatus comprising a processor operable to receive the device consumption for each smart device and to determine an individual consumption for each home based on the received device consumptions. The processor may further compare the individual consumptions of similar homes to each other and transmit an alert with a recommendation indicating how to decrease the individual consumption of a home.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
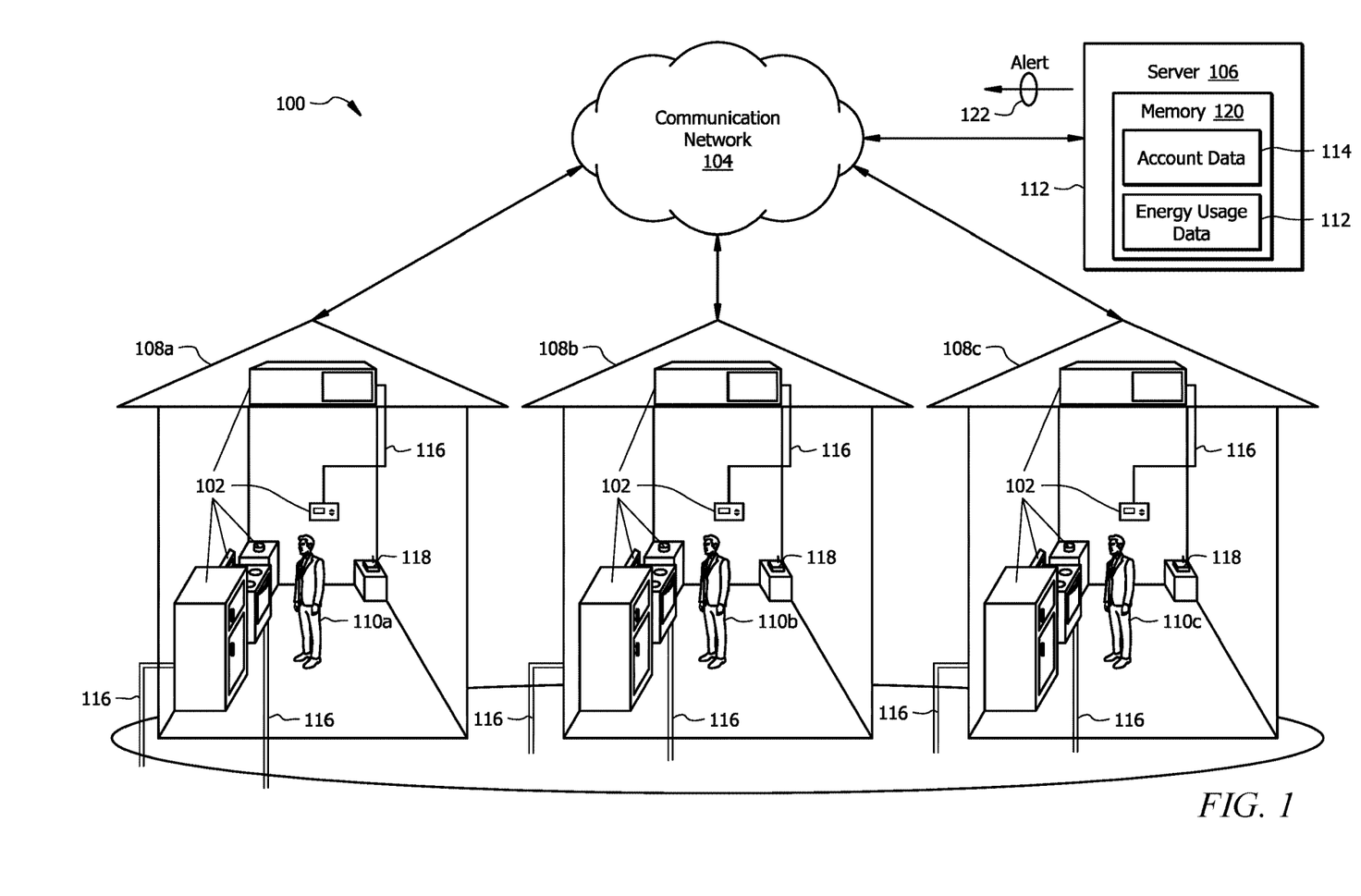
FIG. 1 is a schematic diagram of an example system for determining individual consumption for a plurality of users through computer network monitoring.
Figure 2:
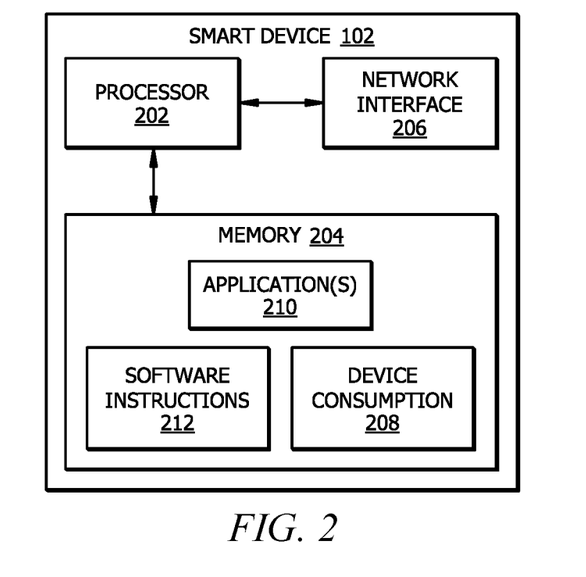
FIG. 2 is a block diagram of an example smart device of the system of FIG. 1.
Figure 3:
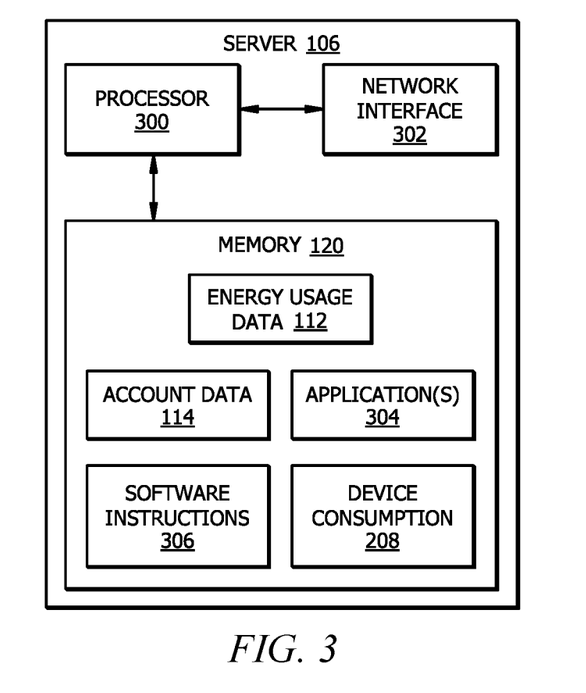
FIG. 3 is a block diagram of an example server of the system of FIG. 1.
Figure 4:
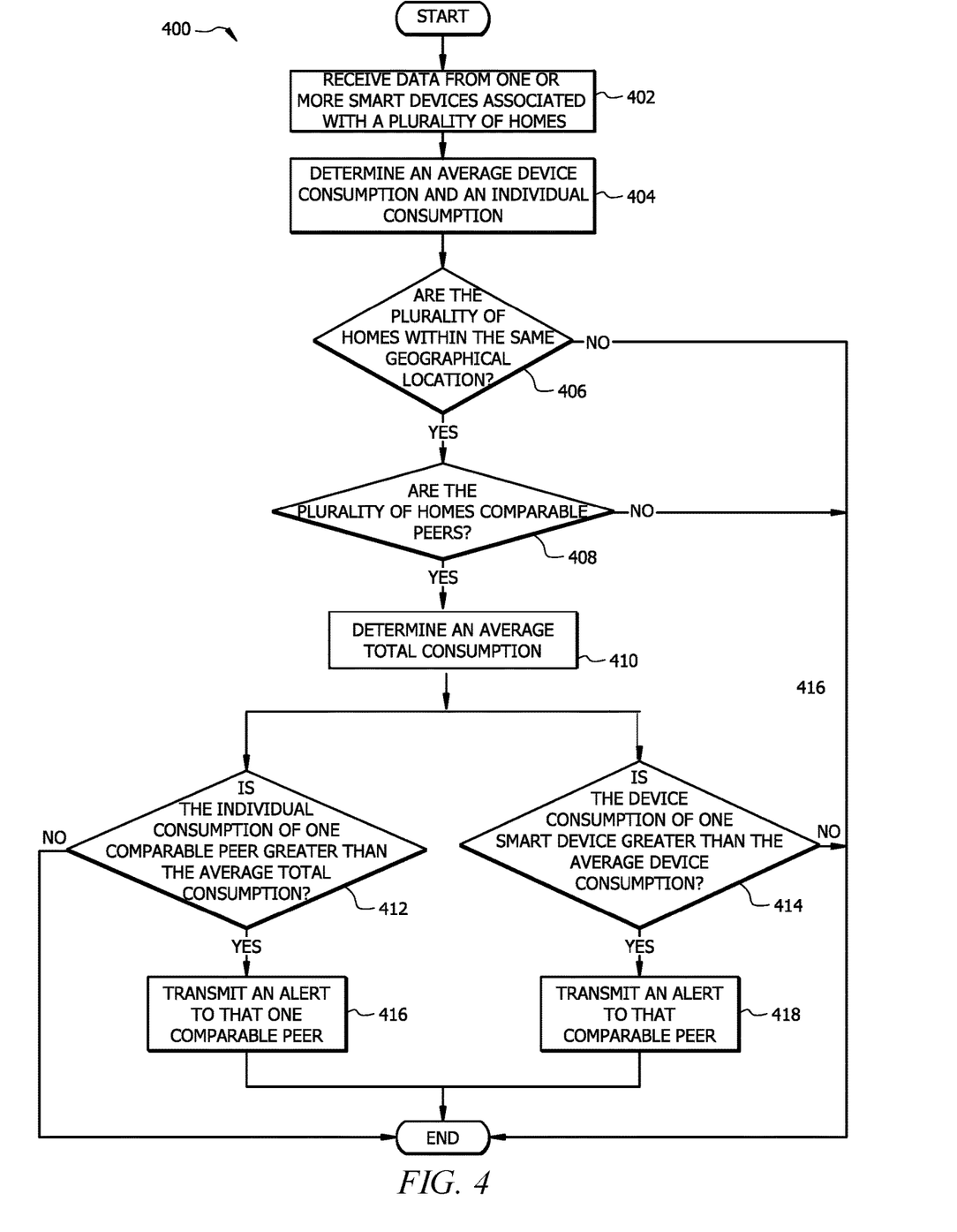
FIG. 4 is a flow diagram illustrating an example operation of the system of FIG. 1.

This disclosure provides solutions to the aforementioned and other problems of previous technology by monitoring data from one or more smart devices and transmitting an alert to a user if an individual consumption associated with that user is greater than an average total consumption. FIG. 1 is a schematic diagram of an example system for determining individual consumption for a plurality of users through computer network monitoring. FIG. 2 is a block diagram of an example smart device of the system of FIG. 1. FIG. 3 is a block diagram of an example server of the system of FIG. 1. FIG. 4 is a flow diagram illustrating an example operation of the system of FIG. 1.

Example System for Determining Individual Consumption for a Plurality of Users Through Computer Network Monitoring FIG. 1 illustrates a schematic diagram of an example system 100 for determining individual consumption for a plurality of users through computer network monitoring. The system 100 may include one or more smart devices 102, a communication network 104, and a server 106. The one or more smart devices 102 may be communicatively coupled to the communication network 104 and may be operable to transmit data to the server 106 through the communication network 104. In general, each of the one or more smart devices 102 may be associated with a location, such as a home 108. For example, there may be one or more smart devices 102 disposed at a first home 108a, a second home 108b, or a third home 108c. In embodiments, a user 110 may be associated with each home 108. For example, a first user 110a may be associated with the first home 108a, a second user 110b may be associated with the second home 108b, and a third user 110c may be associated with the third home 108c. While the present example is directed to one or more smart devices 102 disposed at the first home 108a, the second home 108b, or the third home 108c, the system 100 is not limited to this use (for example, a greater number of homes 108 may be used with the system 100).

The one or more smart devices 102 may be configured to monitor a device consumption of that smart device 102 and send a signal to the server 106 to transmit the device consumption as data. The device consumption may be the magnitude of a utility (for example, electricity, water, or natural gas) used by the smart device 102 for a period of time at the associated home 108. The server 106 may receive the data transmitted by each of the one or more smart devices 102 and may process the received data with additional data, such as energy usage data 112 and account data 114, to determine an individual consumption associated with a particular home 108. In embodiments, the energy usage data 112 may comprise the amount of energy consumption by the home 108 within a period of time (for example, one month). The account data 114 may comprise a log of transactions over time initiated by a particular user 110 associated with the home 108. Once the server 106 determines the individual consumption associated with a particular home 108, the server 106 may compare individual consumptions of a plurality of homes 108 and determine an average total consumption. An alert may be transmitted to an associated user 110 of one of the plurality of homes 108 if the individual consumption of that home 108 is greater than the average total consumption. For example, the server 106 may determine the individual consumptions for each of the first home 108a, the second home 108b, and the third home 108c. The server 106 may then determine an average total consumption based on the individual consumptions for each of the first home 108a, the second home 108b, and the third home 108c. If the individual consumption of the first home 108a is greater than the determined average total consumption, the server 106 may transmit an alert to the first user 110a indicating that the individual consumption of the first home 108a is greater than the average total consumption.

The one or more smart devices 102 of the system 100 may generally be any suitable appliance operable to be connected to other devices or networks via wireless protocols that operate collectively as an internet of things (IoT) system. For example, the one or more smart devices 102 may be a refrigerator, freezer, thermostat, air conditioning unit, stove, oven, lightbulbs, or any other suitable appliance operable to connect and exchange data with other devices and systems over the communication network 104. Each of the one or more smart devices 102 may be coupled to a utility line 116. The utility line 116 may be configured to provide access to a utility for use by the one or more smart devices 102 coupled to that utility line 116. The utility line 116 may be a water line, a power line, or a natural gas line. In certain embodiments, the one or more smart devices 102 may be coupled to more than one utility line 116. For example, if one of the one or more smart devices 102 is a freezer, that one of the one or more smart devices 102 may be coupled to two individual utility lines 116, where one of the utility lines 116 is a water line and the other utility line 116 is a power line. Each of the one or more smart devices 102 may be operable to monitor a consumption of the utility provided by the utility line 116 coupled to that one of the one or more smart devices 102 over time as device consumption and may transmit the device consumption to the server 106 over the communication network 104. An example one of the one or more smart devices 102 and its operations using a respective processor, memory, and interface is described below with respect to FIGS. 2 and 4.

The communication network 104 may facilitate communication between the one or more smart devices 102 and the server 106. This disclosure contemplates the communication network 104 being any suitable network operable to facilitate communication between the one or more smart devices 102 and the server 106. Communication network 104 may include any interconnecting system capable of transmitting audio, video, signals, data, messages, or any combination of the preceding. Communication network 104 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. In embodiments, the communication network 104 may be accessed by the one or more smart devices 102 by using a router 118. As illustrated, each home 108 may comprise a router 118 for the one or more smart devices 102 associated with that home 108. The router 118 may be a networking device that is configured to enable wired and/or wireless communications between the communication network 104 and other network devices, systems, or domain(s). For example, the router 118 may be configured to send and receive data to the communication network 104 and to the one or more smart devices 102. The router 118 may be configured to use any suitable type of communication protocol as would be appreciated by one of ordinary skill in the art.

The server 106 is generally a suitable server (e.g., including a physical server and/or virtual server) operable to store data in a memory 120 and/or provide access to application(s) or other services. For example, the server 106 may store energy usage data 112 for a plurality of homes 108 and account data 114 for a plurality of users 110. The server 106 may be a database operable to receive data from the one or more smart devices 102 and to process the received data with the energy usage data 112 and/or the account data 114. The server 106 may be operable to determine an average total consumption for a plurality of homes 108 with similar characteristics based on the received data from the one or more smart devices 102, the energy usage data 112, and the account data 114. The server 106 may be further operable to transmit an alert 122 to an associated user 110 if an individual consumption of one of the plurality of homes 108 exceeds the average total consumption. Prior to determining the average total consumption, the server 106 may be operable to determine which of the plurality of homes 108 are comparable peers, wherein comparable peers is a grouping where each member of the grouping comprises similar characteristics (for example, size of the home 108) within a distance threshold from each other. An example server 106 and its operations using a respective processor, memory, and interface is described below with respect to FIGS. 3-4.

Example Operation of the System

In an example operation of the system 100, as illustrated in FIG. 1, each of the first home 108a, the second home 108b, and the third home 108c may comprise one or more smart devices 102 associated with that home 108. Each of the one or more smart devices 102 may monitor a consumption of the utility provided by the utility line 116 coupled to that one of the one or more smart devices 102 over time as device consumption. For example, the one or more smart devices 102 may monitor the consumption of water, electricity, natural gas, and combinations thereof depending on the type of utility line 116. In embodiments, the one or more smart devices 102 may be operable to determine a consumption of water, natural gas, power, and any combination thereof. The one or more smart devices 102 may transmit the device consumption to the communication network 104, wherein the one or more smart devices 102 may be communicatively coupled to the communication network 104 via the router 118 disposed at each of the first home 108a, the second home 108b, and the third home 108c.

The server 106 may be operable to receive the transmitted device consumption of each of the one or more smart devices 102 as data through data streaming between the one or more smart devices 102 and the server 106. In embodiments, data streaming may be where the one or more smart devices 102 and the server 106 continuously exchange data over and are connected to the communication network 104. Once the server 106 has received the device consumption, the server 106 may further be operable to determine an average device consumption for each of the one or more smart devices 102 and an individual consumption for each of the first home 108a, the second home 108b, and the third home 108c. In embodiments, the individual consumption may be the summation of the average device consumption for each of the one or more smart devices 102 associated with the first home 108a, the second home 108b, or the third home 108c, where the individual consumption may be further categorized by the type of utility monitored (for example, individual consumption of water, electricity, or natural gas).

After determining the individual consumptions of the first home 108a, the second home 108b, and the third home 108c, the server 106 may be operable to determine the members of a grouping designated as comparable peers, where comparable peers are determined based, in part, on location and similar characteristics (for example, square footage of the home 108, number of rooms, etc.). The server 106 may determine whether the first home 108a, the second home 108b, the third home 108c, and any combination thereof are located within a distance threshold from each other based on geolocation information. The distance threshold may be selected from a group consisting of a predetermined value (for example, within a radius of one mile), a zip code, the limits or boundaries of a city, the limits or boundaries of a state, a regional area encompassing a plurality of states, and any combination thereof. For example, the server 106 may determine that the first home 108a and the second home 108b are within the distance threshold from each other, but the third home 108c may be further away and exceed the distance threshold from both the first home 108a and the second home 108b. The server 106 may then determine whether the first home 108a is a comparable peer to the second home 108b based on similar characteristics. For example, the server 106 may determine that the size of the first home 108a, the number of rooms of the first home 108a, or a combination thereof, is within a tolerable threshold when compared to the second home 108b. In this example, the first home 108a may be designated as a comparable peer to the second home 108b, by the server 106, if the square footage of the first home 108a is 2,500 ft$^2$, the square footage of the second home 108b is 2,400 ft$^2$, and the threshold is 10%. In these embodiments, the server 106 may be able to determine the members of comparable peers based, at least in part, on the received data from the one or more smart devices 102, the energy usage data 112 stored in the memory 120, the account data 114 stored in the memory 120, and any combination thereof.

Once the comparable peers have been determined, the server 106 may be operable to determine an average total consumption based, in part, on the individual consumption of each of the members of the comparable peers. For example, if the first home 108a and the second home 108b are comparable peers, the server 106 may determine the average total consumption based on the individual consumptions of the first home 108a and the second home 108b. In one or more embodiments, if an individual consumption of one of the members of the comparable peers is greater than the average total consumption, the server 106 may be operable to transmit the alert 122 to a user 110 associated with the individual consumption greater than the average total consumption. For example, if the individual consumption of the first home 108a is greater than the average total consumption, the server 106 may transmit the alert 122 to the first user 110a as the first user 110a is associated with the first home 108a.

The alert 122 may indicate that the individual consumption of that one of the comparable members is greater than the average total consumption. The alert 122 may further provide a recommendation to take an action in order to decrease the individual consumption. In one or more embodiments, the server 106 may access the account data 114 stored in the memory 120 to determine if the alert 122 will comprise a recommendation. For example, the server 106 may access the account data 114 associated with the second user 110b to determine the presence of a transaction contained within the log of transactions in the account data 114 that corresponds to a decrease in the individual consumption of the second home 108b (for example, a transaction providing that the second user 110b purchased and installed a newer model of thermostat that operates with a greater efficiency). Alternatively, the server 106 may access the account data 114 associated with the first user 110a to determine the presence of a transaction contained within the log of transactions in the account data 114 that corresponds to an increase in the individual consumption of the first home 108a (for example, a transaction providing that the first user 110a purchased and installed a less efficient refrigerator). Once the server 106 determines that transaction, the server 106 may include a recommendation for the particular user 110 to take an action, based on the determined transaction, to decrease the individual consumption. The server 106 may identify which of the members of the comparable peers did not experience a corresponding decrease in the individual consumption based on a determined transaction and transmit the alert 122 to those members indicating that the determined transaction corresponds to a decrease in the individual consumption for one of the members of the comparable peers.

In one or more embodiments, the server 106 may be further operable to transmit the alert 122 to a user 110 when a device consumption is greater than an average device consumption for each of the one or more smart devices 102 for each home 108. For example, if one of the one or more smart devices 102 associated with the first home 108a is operating a device consumption greater than the average device consumption for that one of the one or more smart devices 102, the server 106 my transmit the alert 122 to the first user 110a. As described above, the alert 122 may indicate that the device consumption of that one of the one or more smart devices 102 is greater than the average device consumption of that one of the one or more smart devices 102. For example, if one of the one or more smart devices 102 at the first home 108a is a dish washing machine leaking water, the server 106 may transmit the alert 122 to the first user 110a indicating that the device consumption of that one of the one or more smart devices 102 is greater than the average device consumption of that one of the one or more smart devices 102. The server 106 may determine that the dish washing machine is leaking water, in this example, by receiving data from that one of the one or more smart devices 102 providing that there is device consumption of water during periods of time where there is not device consumption of electricity.

Example Smart Device

FIG. 2 is an example of one of the one or more the smart devices 102 of FIG. 1. The smart device 102 may include a processor 202, a memory 204, and a network interface 206. The smart device 102 may be configured as shown or in any other suitable configuration.

The processor 202 comprises one or more processors operably coupled to the memory 204. The processor 202 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The processor 202 is communicatively coupled to and in signal communication with the memory 204 and the network interface 206. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1-2 and 4. In some embodiments, the function described herein is implemented using logic units, FPGAs, ASICs, DSPs, or any other suitable hardware or electronic circuitry.

The memory 204 is operable to store any of the information described with respect to FIGS. 1-2 and 4 along with any other data, instructions, logic, rules, or code operable to implement the function(s) described herein when executed by processor 202. For example, the memory 204 may store the device consumption 208, code for application(s) 210, and/or software instructions 212, which are described below with respect to FIG. 4. The memory 204 comprises one or more disks, tape drives, or solid-state drives, and may be used as an over-flow data storage device, to store programs when such programs are selected for execution, and to store instructions and data that are read during program execution. The memory 204 may be volatile or non-volatile and may comprise read-only memory (ROM), random-access memory (RAM), ternary content-addressable memory (TCAM), dynamic random-access memory (DRAM), and static random-access memory (SRAM).

The network interface 206 is configured to enable wired and/or wireless communications. The network interface 206 is configured to communicate data between the smart device 102 and other network devices, systems, or domain(s). For example, the network interface 206 may comprise a WIFI interface, a local area network (LAN) interface, a wide area network (WAN) interface, a modem, a switch, or a router. The processor 202 is configured to send and receive data using the network interface 206. The network interface 206 may be configured to use any suitable type of communication protocol as would be appreciated by one of ordinary skill in the art.

Example Server

FIG. 3 is an example server 106 of FIG. 1. The server 106 may include a processor 300, the memory 120, and a network interface 302. The server 106 may be configured as shown or in any other suitable configuration.

The processor 300 comprises one or more processors operably coupled to the memory 120. The processor 300 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 300 may be a programmable logic device, a microcontroller, a microprocessor, or any suitable combination of the preceding. The processor 300 is communicatively coupled to and in signal communication with the memory 120 and the network interface 302. The one or more processors are configured to process data and may be implemented in hardware or software. For example, the processor 300 may be 8-bit, 16-bit, 32-bit, 64-bit or of any other suitable architecture. The processor 300 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1 and 3-4. In some embodiments, the function described herein is implemented using logic units, FPGAs, ASICs, DSPs, or any other suitable hardware or electronic circuitry.

The memory 120 is operable to store any of the information described with respect to FIGS. 1 and 3-4 along with any other data, instructions, logic, rules, or code operable to implement the function(s) described herein when executed by processor 300. For example, the memory 120 may store the energy usage data 112, account data 114, device consumption 208, code for application(s) 304, and/or software instructions 306, which are described below with respect to FIG. 4. The memory 120 comprises one or more disks, tape drives, or solid-state drives, and may be used as an over-flow data storage device, to store programs when such programs are selected for execution, and to store instructions and data that are read during program execution. The memory 120 may be volatile or non-volatile and may comprise read-only memory (ROM), random-access memory (RAM), ternary content-addressable memory (TCAM), dynamic random-access memory (DRAM), and static random-access memory (SRAM).

The network interface 302 is configured to enable wired and/or wireless communications. The network interface 302 is configured to communicate data between the smart device 102 and other network devices, systems, or domain(s). For example, the network interface 302 may comprise a WIFI interface, a local area network (LAN) interface, a wide area network (WAN) interface, a modem, a switch, or a router. The processor 300 is configured to send and receive data using the network interface 302. The network interface 302 may be configured to use any suitable type of communication protocol as would be appreciated by one of ordinary skill in the art.

Example Operation of the System for Determining Individual Consumption for a Plurality of Users Through Computer Network Monitoring FIG. 4 is a flow diagram illustrating an example method 400 of the system 100 of FIG. 1. The method 400 may be implemented using the one or more smart devices 102 of FIG. 1 and the server 106 of FIG. 1. The method 400 may begin at step 402 where the one or more smart devices 102 may transmit data containing the device consumption 208 (referring to FIG. 2) of each one of the one or more smart devices 102 to the server 106 through the communication network 104 (referring to FIG. 1). The device consumption may be the magnitude of a utility (for example, electricity, water, or natural gas) used by that one of the one or more smart devices 102 for a period of time. The processor 300 (referring to FIG. 3) of the server 106 may be configured to receive the device consumption 208 for each one of the one or more smart devices 102. The processor 300 may transmit to the memory 120 (referring to FIG. 3) of the server 106 the received device consumption 208, wherein the memory 120 may be operable to store the received device consumption 208 as data. Further, the processor 300 may be operable to determine that each of the one or more smart devices 102 is associated with a particular user 110 and may instruct the memory 120 to store the received device consumption 208 for that particular user 110.

At step 404, the processor 300 may determine an average device consumption for each of the one or more smart devices 102 and an individual consumption for each of the plurality of homes 108 (referring to FIG. 1), wherein each one of the one or more smart devices 102 is associated with one of the plurality of homes 108. In embodiments, the individual consumption may be the summation of the average device consumptions for each of the one or more smart devices 102 associated with one of the plurality of homes 108. Further, the individual consumption may be categorized by the type of utility that the one or more smart devices 102 is configured to monitor (for example, individual consumption of water, electricity, or natural gas).

At step 406, the processor 300 may be operable to begin the process of determining the members of comparable peers selected from the plurality of homes 108 based, in part, on location and similar characteristics (for example, square footage of each one of the plurality of homes 108, number of rooms, etc.). During step 406, the processor 300 may be configured to determine whether each one of the plurality of homes 108 is located within a distance threshold from each other based on geolocation information. In embodiments, the distance threshold may be selected from a group consisting of a predetermined value (for example, within a radius of one mile), a zip code, the limits or boundaries of a city, the limits or boundaries of a state, a regional area encompassing a plurality of states, and any combination thereof. If the processor 300 determines that each one of the plurality of homes 108 is not located within the distance threshold from each other based on geolocation information, the method 400 proceeds to end. If the processor 300 determines that a portion of the plurality of homes 108 is located within the distance threshold from each other based on geolocation information, the method 400 proceeds to step 408.

At step 408, the processor 300 may determine whether the portion of the plurality of homes 108 from step 406 are comparable peers based on similar characteristics. For example, the processor 300 may compare the difference between characteristics such as size, number of rooms, or combinations thereof for each one of the portion of the plurality of homes 108 to a threshold (for example, 10%). While the present example is directed to characteristics such as size and the number of rooms, the method 400 is not limited to these characteristics. In embodiments, the processor 300 may be able to determine the members of comparable peers based, at least in part, on the received device consumption 208 from the one or more smart devices 102, the energy usage data 112 stored in the memory 120, the account data 114 stored in the memory 120, and any combination thereof. If the processor 300 determines that each one of the portion of the plurality of homes 108 from step 406 are not comparable peers, the method 400 proceeds to end. If the processor 300 determines that at least two of the portion of the plurality of homes 108 from step 406 are comparable peers, the method 400 proceeds to step 410.

At step 410, the processor 300 may determine an average total consumption based on the individual consumption of each of the members of the comparable peers. Once the average total consumption is determined, the method 400 may proceed to step 412, to step 412, or may proceed to both of steps 412, 414 concurrently.

At step 412, the processor 300 may determine whether an individual consumption of one of the portion of the plurality of homes 108 within the comparable peers is greater than the average total consumption. If the individual consumption of one of the portion of the plurality of homes 108 within the comparable peers is not greater than the average total consumption, the method 400 proceeds to end. Otherwise, if the individual consumption of one of the portion of the plurality of homes 108 within the comparable peers is greater than the average total consumption, the method 600 proceeds to step 416.

At step 416, the processor 300 may transmit the alert 122 (referring to FIG. 1) to a user 110 (referring to FIG. 1) associated with the one of the portion of the plurality of homes 108 having the individual consumption greater than the average total consumption. The alert 122 may indicate that the individual consumption of that one of the portion of the plurality of homes 108 of the comparable members is greater than the average total consumption. The alert 122 may further provide a recommendation for the user 110 to take an action in order to decrease the individual consumption. In these embodiments, the processor 300 may access the account data 114 stored in the memory 120 to determine if the alert 122 will comprise a recommendation, wherein the account data 114 is associated with each user 110 that is associated with each one of the portion of the plurality of homes 108 of the comparable members. The processor 300 may determine the presence of a transaction contained within the log of transactions in the account data 114 that corresponds to either an increase or a decrease in the individual consumption of one of the portion of the plurality of homes 108 of the comparable members. If the processor 300 determines that there is a transaction that corresponds to an increase or decrease in individual consumption, the processor 300 may include the recommendation with the transmission of the alert 122. Otherwise, the alert 122 may not include a recommendation. After the processor 300 transmits the alert 122 to the associated user 110, the method 400 proceeds to end.

With reference back to step 414, the processor 300 may determine whether a device consumption of one of the one or more smart devices 102 is greater than the average device consumption of that one of the one or more smart devices 102. If the device consumption of one of the one or more smart devices 102 is not greater than the average device consumption of that one of the one or more smart devices 102, the method 400 proceeds to end. Otherwise, the method 400 proceeds to step 418.

At step 418, the processor 300 may transmit the alert 122 to a user 110 associated with the one of the plurality of homes 108 containing the one of the one or more smart devices 102 having the device consumption greater than the average device consumption for that one of the one or more smart devices 102. The alert 122 may indicate that the device consumption of that one of the one or more smart devices 102 is greater than the average device consumption of that one of the one or more smart devices 102. After the processor 300 transmits the alert 122 to the associated user 110, the method 400 proceeds to end.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. An apparatus for determining individual consumption for a plurality of users through computer network monitoring, comprising:
   a memory, associated with a server, operable to:
      store energy usage data comprising the amount of energy consumption for a first home associated with a first user and a second home associated with a second user; and
      store account data for the first user and the second user, wherein the account data comprises a log of transactions over time for each of the first user and the second user; and
   a processor, associated with the server, operably coupled to the memory, configured to:
      receive data from one or more smart devices associated with the first user through data streaming between the one or more smart devices and the server;
      receive data from one or more smart devices associated with the second user through data streaming between the one or more smart devices and the server;

transmit the received data from the one or more smart devices associated with the first user and the second user to the memory for storage;

determine that the first home and the second home are located within a distance threshold from each other based, at least in part, on geolocation information;

determine that the first user and the second user are members of a grouping designated as comparable peers, based, at least in part, on:
- the received data from the one or more smart devices associated with each of the first user and the second user,
- the energy usage data for each of the first home and the second home, and
- the account data for each of the first user and the second user;

wherein the received data, energy usage data, and account data of each of the members is within a threshold for the comparable peers;

monitor the one or more smart devices of the members of the comparable peers over a period of time to determine an average total consumption based, in part, on an individual consumption of each of the members of the comparable peers;

determine that the individual consumption of one of the members of the comparable peers is greater than the average total consumption; and transmit an alert to the one of the members of the comparable peers with the individual consumption greater than the average total consumption indicating that the individual consumption of that one of the members is greater than the average total consumption.

2. The apparatus of claim 1, wherein each of the one or more smart devices associated with the first user or second user is coupled to an utility line and configured to:

determine a device consumption through the utility line for each of the one or more smart devices for the first user or the second user; and transmit data comprising the device consumption for each of the one or more smart devices to the server through a communication network, wherein the processor associated with the server is configured to determine the individual consumption based on the transmitted data received by the server,
if the one or more smart devices is associated with the first user, the memory is configured to store the device consumption for each of the one or more smart devices as device consumptions for the first user and to store the individual consumption for the first user,
if the one or more smart devices is associated with the second user, the memory is configured to store the device consumption for each of the one or more smart devices as device consumptions for the second user and to store the individual consumption for the second user.

3. The apparatus of claim 2, wherein the processor associated with the server is further configured to:

determine an average device consumption for each of the one or more smart devices; and if the device consumption for one of the one or more smart devices is greater than the average device consumption, transmit an alert to the member of the comparable peers associated with that one of the one or more smart devices indicating that the device consumption for one of the one or more smart devices is greater than the average device consumption.

4. The apparatus of claim 2, wherein the utility line is a water line, a power line, or a gas line, wherein each of the one or more smart devices associated with the first user or second user is coupled to at least one utility line.

5. The apparatus of claim 4, wherein the one or more smart devices coupled to the utility line is configured to:

determine a consumption of water as the device consumption through the utility line for each of the one or more smart devices for the first user or the second user if the utility line is the water line;

determine a consumption of natural gas as the device consumption through the utility line for each of the one or more smart devices for the first user or the second user if the utility line is the gas line; and determine a consumption of power as the device consumption through the utility line for the first user or the second user if the utility line is the power line.

6. The apparatus of claim 1, wherein the processor associated with the server is further configured to:

access the account data for the first user or the second user stored in the memory;

determine that a transaction contained within the log of transactions in the account data corresponds to a decrease in the individual consumption for the first user or the second user;

identify the members of the comparable peers that did not experience a corresponding decrease in the individual consumption based on the determined transaction; and transmit an alert to the members of the comparable peers indicating that the determined transaction corresponds to a decrease in the individual consumption for one of the members of the comparable peers, where the alert for each one of the identified members further comprises a recommendation to take an action, based on the determined transaction, to decrease the individual consumption for that identified member.

7. The apparatus of claim 1, wherein the memory is further operable to:

store energy usage data comprising the amount of energy consumption for a third home associated with a third user; and store account data for the third user, wherein the account data comprises a log of transactions over time for the third user; and wherein the processor is further configured to:
receive data from one or more smart devices associated with the third user;
transmit the received data from the one or more smart devices associated with the third user to the memory for storage, wherein the memory is configured to store the received data as device consumption for each of the one or more smart devices associated with the first user, second user, and third user and to store an individual consumption for the first user, second user, and third user;
determine that the first home, the second home, and the third home are located within the distance threshold from each other based, at least in part, on geolocation information; and
determine that the first user, the second user, and the third user are members of the grouping designated as comparable peers.

8. A method for determining individual consumption for a plurality of users through computer network monitoring, comprising:

receiving data from one or more smart devices associated with a first user through data streaming between the one or more smart devices and a server;

receiving data from one or more smart devices associated with a second user through data streaming between the one or more smart devices and the server;

determining that a first home associated with the first user and a second home associated with the second user are located within a distance threshold from each other based, at least in part, on geolocation information;

determining that the first home and the second home are members of a grouping designated as comparable peers, based, at least in part, on:

the received data from the one or more smart devices associated with each of the first user and the second user, energy usage data for each of the first home and the second home, wherein the energy usage data comprises the amount of energy consumption for the first home and the second home, and account data for each of the first user and the second user, wherein the account data comprises a log of transactions over time for each of the first user and the second user;

wherein the received data, energy usage data, and account data of each of the members is within a threshold for the comparable peers;

monitoring the one or more smart devices of the members of the comparable peers over a period of time to determine an average total consumption based, in part, on an individual consumption of each of the members of the comparable peers;

determining that the individual consumption of one of the members of the comparable peers is greater than the average total consumption; and transmitting an alert to the one of the members of the comparable peers with the individual consumption greater than the average total consumption indicating that the individual consumption of that one of the members is greater than the average total consumption.

9. The method of claim 8, wherein each of the one or more smart devices associated with the first user or second user is coupled to at least one utility line, wherein the utility line is a water line, a power line, or a gas line.

10. The method of claim 9, further comprising:

determining a device consumption through the utility line for each of the one or more smart devices for the first user or the second user; and transmitting data comprising the device consumption for each of the one or more smart devices to the server through a communication network, wherein a processor associated with the server is configured to determine the individual consumption based on the transmitted data received by the server, if the one or more smart devices is associated with the first user, a memory of the server is configured to store the device consumption for each of the one or more smart devices as device consumptions for the first user and to store the individual consumption for the first user, if the one or more smart devices is associated with the second user, the memory of the server is configured to store the device consumption for each of the one or more smart devices as device consumptions for the second user and to store the individual consumption for the second user.

11. The method of claim 10, further comprising:

determining an average device consumption for each of the one or more smart devices; and if the device consumption for one of the one or more smart devices is greater than the average device consumption, transmit an alert to the member of the comparable peers associated with that one of the one or more smart devices indicating that the device consumption for one of the one or more smart devices is greater than the average device consumption.

12. The method of claim 9, further comprising:

determining a consumption of water as the device consumption through the utility line for each of the one or more smart devices for the first user or the second user if the utility line is the water line;

determining a consumption of natural gas as the device consumption through the utility line for each of the one or more smart devices for the first user or the second user if the utility line is the gas line; and determining a consumption of power as the device consumption through the utility line for the first user or the second user if the utility line is the power line.

13. The method of claim 8, further comprising:

accessing the account data associated with the first user or the second user stored in the server;

determining that a transaction contained within a log of transactions in the account data corresponds to a decrease in the individual consumption for the first user or the second user;

identifying the members of the comparable peers that did not experience a corresponding decrease in the individual consumption based on the determined transaction; and transmitting an alert to the members of the comparable peers indicating that the determined transaction corresponds to a decrease in the individual consumption for one of the members of the comparable peers, where the alert for each one of the identified members further comprises a recommendation to take an action, based on the determined transaction, to decrease the individual consumption for that identified member.

14. The method of claim 8, further comprising:

receiving data from one or more smart devices associated with a third user;

determining that the first home, the second home, and a third home associated with the third user are located within the distance threshold from each other based, at least in part, on geolocation information; and determining that the first user, the second user, and the third user are members of the grouping designated as comparable peers.

15. A non-transitory computer-readable medium comprising instructions that are configured, when executed by a processor of a server, to:

receive data from one or more smart devices associated with a first user through data streaming between the one or more smart devices and the server;

receive data from one or more smart devices associated with a second user through data streaming between the one or more smart devices and the server;

transmit the received data from the one or more smart devices associated with the first user and the second user to a memory, associated with the server and communicatively coupled to the processor, for storage;

determine that a first home associated with the first user and a second home associated with the second user are located within a distance threshold from each other based, at least in part, on geolocation information;

determine that the first user and the second user are members of a grouping designated as comparable peers, based, at least in part, on:

the received data from the one or more smart devices associated with each of the first user and the second user, energy usage data for each of the first home and the second home, wherein the energy usage data comprises the amount of energy consumption for the first home and the second home, and account data for each of the first user and the second user, wherein the account data comprises a log of transactions over time for each of the first user and the second user;

wherein the received data, energy usage data, and account data of each of the members is within a threshold for the comparable peers;

monitor the one or more smart devices of the members of the comparable peers over a period of time to determine an average total consumption based, in part, on an individual consumption of each of the members of the comparable peers;

determine that the individual consumption of one of the members of the comparable peers is greater than the average total consumption; and transmit an alert to the one of the members of the comparable peers with the individual consumption greater than the average total consumption indicating that the individual consumption of that one of the members is greater than the average total consumption.

16. The non-transitory computer-readable medium of claim 15, wherein the instructions are further configured to:

receive a device consumption from each of the one or more smart devices for the first user or the second user; and determine the individual consumption for the first user or the second user based on the received device consumption.

17. The non-transitory computer-readable medium of claim 16, wherein the instructions are further configured to:

determine an average device consumption for each of the one or more smart devices; and if the device consumption for one of the one or more smart devices is greater than the average device consumption, transmit an alert to the member of the comparable peers associated with that one of the one or more smart devices indicating that the device consumption for one of the one or more smart devices is greater than the average device consumption.

18. The non-transitory computer-readable medium of claim 15, wherein the instructions are further configured to:

access the account data for the first user or the second user stored in the memory; and determine that a transaction contained within a log of transactions in the account data corresponds to a decrease in the individual consumption for the first user or the second user.

19. The non-transitory computer-readable medium of claim 18, wherein the instructions are further configured to:

identify the members of the comparable peers that did not experience a corresponding decrease in the individual consumption based on the determined transaction; and transmit an alert to the members of the comparable peers indicating that the determined transaction corresponds to a decrease in the individual consumption for one of the members of the comparable peers, where the alert for each one of the identified members further comprises a recommendation to take an action, based on the determined transaction, to decrease the individual consumption for that identified member.

20. The non-transitory computer-readable medium of claim 15, wherein the instructions are further configured to:

receive data from one or more smart devices associated with a third user;

transmit the received data from the one or more smart devices associated with the third user to the memory for storage, wherein the memory is configured to store the received data as device consumption for each of the one or more smart devices associated with the first user, second user, and third user and to store an individual consumption for the first user, second user, and third user;

determine that the first home, the second home, and a third home associated with the third user are located within the distance threshold from each other based, at least in part, on geolocation information; and determine that the first user, the second user, and the third user are members of the grouping designated as comparable peers.

* * * * *